(12) United States Patent
Hsu

(10) Patent No.: US 7,022,927 B2
(45) Date of Patent: Apr. 4, 2006

(54) KEYBOARDS WITH ELEVATED KEYS

(75) Inventor: Chien-Shih Hsu, Taipei (TW)

(73) Assignee: Darfon Electronics Corp., Kweishan Taoyuan (TW)

( * ) Notice: Subject to any disclaimer, the term of this patent is extended or adjusted under 35 U.S.C. 154(b) by 0 days.

(21) Appl. No.: 11/095,573

(22) Filed: Apr. 1, 2005

(65) Prior Publication Data

US 2005/0217983 A1    Oct. 6, 2005

(30) Foreign Application Priority Data

Apr. 6, 2004 (TW) ............................... 93109464 A
May 19, 2004 (TW) ............................... 93114070 A (51) Int. Cl.
*H01H 13/70* (2006.01)

(52) U.S. Cl. ..................................... 200/344; 361/680

(58) Field of Classification Search ............. 400/495.1, 400/496, 495, 491.2, 491, 490; 361/680; 200/5 A, 344

See application file for complete search history.

(56) References Cited

U.S. PATENT DOCUMENTS

| | | | | |
|---|---|---|---|---|
| 5,735,390 | A | * | 4/1998 | Takagi et al. ............... 200/344 |
| 5,793,605 | A | * | 8/1998 | Sellers ........................ 361/680 |
| 5,874,696 | A | * | 2/1999 | Hayashi et al. ............. 200/5 A |
| 5,971,637 | A | * | 10/1999 | Malhi et al. ............. 400/491.2 |
| 6,172,868 | B1 | * | 1/2001 | Oura ........................... 361/680 |
| 6,559,399 | B1 | * | 5/2003 | Hsu et al. .................... 200/344 |

* cited by examiner

*Primary Examiner*—Michael A. Friedhofer
(74) *Attorney, Agent, or Firm*—Birch, Stewart, Kolasch & Birch, LLP (57) ABSTRACT

Keyboards with elevated key structures are provided. An exemplary embodiment of a key structure includes a key cap, a substrate, a slider, a resilient member, a first rod and second rod. The slider is movable in a first direction with respect to the substrate between a first position and a second position. The first rod connects the substrate and the key cap. The second rod connects the key cap, the substrate and the first rod. The resilient member connects the slider and the first rod. When the key structure is in an original state with the slider situated in a first position, the key cap is situated at a first height. When the slider moves from the first position to the second position, the first rod is impelled by the slider, and the key cap descends toward the substrate to a second height less than first height.

32 Claims, 14 Drawing Sheets

KEYBOARDS WITH ELEVATED KEYS

BACKGROUND

The invention relates in general to keyboards and in particular to keyboards with elevated keys.

Figure 1A:
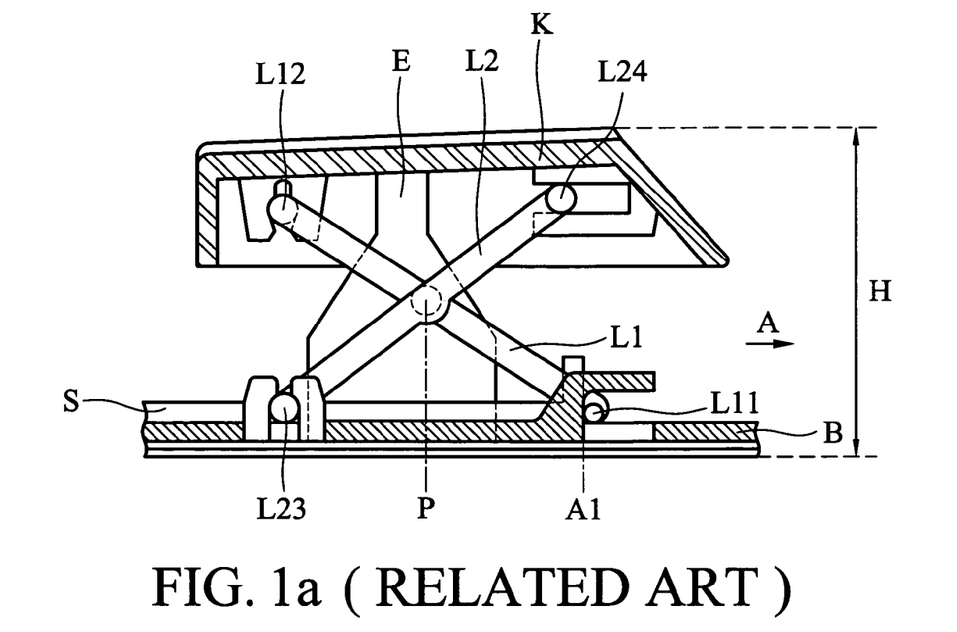
FIGS. 1a and 1b are perspective diagrams of a conventional elevated key structure.
Figure 1B:
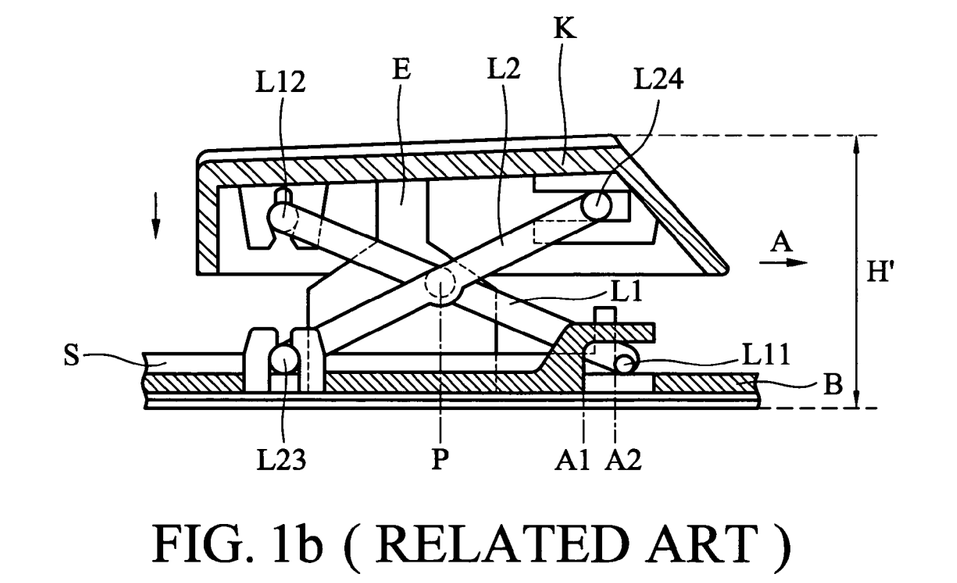

Referring to FIG. 1a, a conventional key structure as disclosed in U.S. Pat. No. 5,874,696 can be vertically depressed by moving a slider S in a first direction A. The conventional key structure in FIG. 1a primarily comprises a substrate B, a first rod L1, a second rod L2, an elastic dome E, a slider S and a key cap K. The first rod L1 has a first end L1 and a second end L12, and the second rod L2 has a third end L23 and a fourth end L24. The first rod L1 and the second rod L2 are pivotally connected via a hinge P. As shown in FIGS. 1a and 1b, the first and fourth ends L11 end L24 are movable and pivotally connected to the substrate B and key cap K respectively. The second and third ends L12 and L23 are pivotally connected to the key cap K and the substrate B respectively When the slider S moves from a first position A1, as shown in FIG. 1a to second position A2, as shown in FIG. 1b, the slider S impels the first end L11 in the first direction A. The key cap K is therefore depressed from height H to height H', and the key structure is in a depressed state. This conventional key structure is usually employed in a keyboard of a laptop computer. The keyboard can be normally used or miniaturized by shifting the slider S.

When the slider S impels the first rod L1 in first direction A, the key structure descends from the original state shown in FIG. 1a to the depressed state shown in FIG. 1b. However, it can be difficult to depress the key cap K by shifting the slider S because the key cap K inevitably exerts an upward elastic force perpendicular to the substrate B due to the compressed elastic dome E. Moreover, the key structure may be situated in the depressed state as shown in FIG. 1b for a long time, adversely decreasing the utility life of the elastic dome E from the long-term deformation.

SUMMARY

Keyboards with elevated key structures are provided. An exemplary embodiment of a key structure includes a key cap, a substrate, a slider, a resilient member, a first rod and second rod. The slider is movable in a first direction with respect to the substrate between a first position and a second position. The first rod includes a first end movable in the first direction and a second end connected to the key cap. The second rod connects the first rod, including a third end and a fourth end. The third end connects the substrate and the fourth end movably connects the key cap. The resilient member connects the slider and the first rod. When the key structure is in an original state with the slider situated in a first position, the key cap is situated at a first height with respect to the substrate. When the slider moves from the first position to the second position, the first rod is impelled by the slider in the first direction, and the key cap descends toward the substrate to a second height less than the first height, such that the key structure is in a depressed state.

An exemplary embodiment of a keyboard includes a substrate and a plurality of key structures. Each key structure includes a key cap, a slider, a resilient member, and a first rod and second rod. The slider is movable in a first direction with respect to the substrate between a first position and a second position. The first rod includes a first end movable in the first direction and a second end connected to the key cap. The second rod connects the first rod, including a third end and a fourth end. The third end connects the substrate and fourth end movably connects the key cap. The resilient member connects the slider and the first rod. When the slider is in a first position, the key structure is in an original state position, and the key cap is situated at a first height with respect to the substrate. When the slider moves from the first position to a second position, the first rod is impelled by the slider in the first direction, and the key cap descends toward the substrate to a second height less than the first height, such that the key structure is in a depressed state.

An exemplary embodiment of a resilient mechanism exerting a recovery force on a key cap includes a substrate, a slider, a resilient member, a first rod, and a second rod. The first rod includes a first end movably connected to the substrate. The second rod connects the first rod, including a third end connected to the substrate. The slider is movable in a first direction with respect to the substrate from a first position to a second position. The resilient member connects the slider and the first rod. When the slider is in the first position and the resilient mechanism is situated in an original state, the first and second rods form a first angle. When the slider moves from the first position to the second position, the first rod is impelled by the slider in the first direction, and the first and second rods form a second angle greater than the first angle, such that the key structure is in a depressed state.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2c is a perspective diagram of an exemplary embodiment of an elevated key structure depressed from the original state shown in FIG. 2a;

FIG. 3b is a sectional view of the elevated key structure in FIG. 3a;

FIG. 4a is a top view of an exemplary embodiment of the elevated key structure depressed from the original state shown in FIG. 3a;

FIG. 4b is a sectional view of the elevated key structure in FIG. 4a;

FIG. 5b is a sectional view of the elevated key structure in FIG. 5a;

FIG. 8c is a perspective diagram of an exemplary embodiment of an elevated key structure depressed from the original state shown in FIG. 8a;

FIG. 9b is a perspective diagram of the connecting member separated from the slider when the resilient member is extended according to FIG. 9a.

DETAILED DESCRIPTION

Figure 2A:
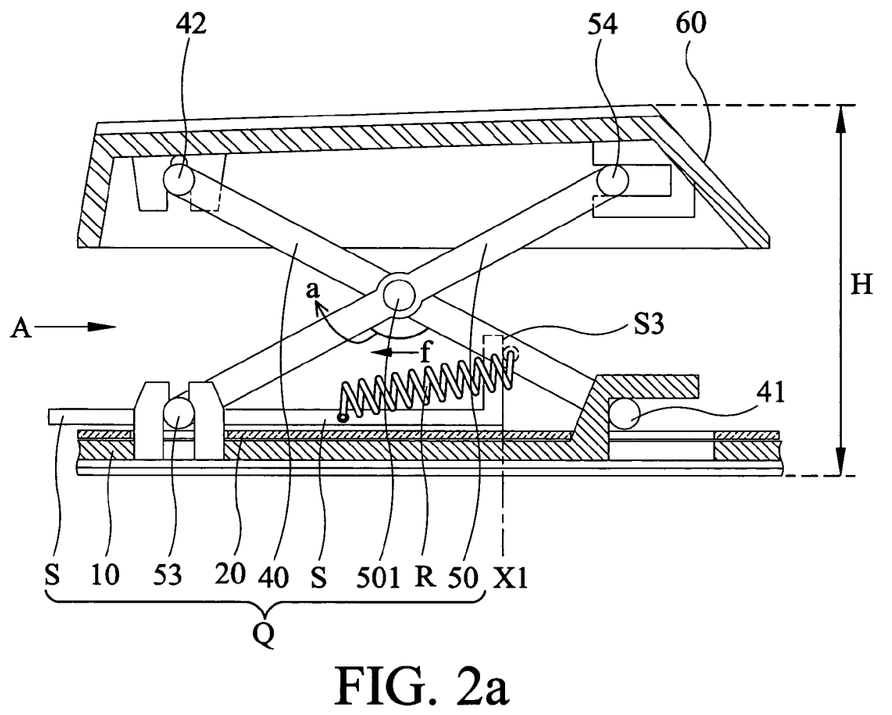
FIG. 2a is a perspective diagram of an exemplary embodiment of an elevated key structure in an original state.
Figure 2B:
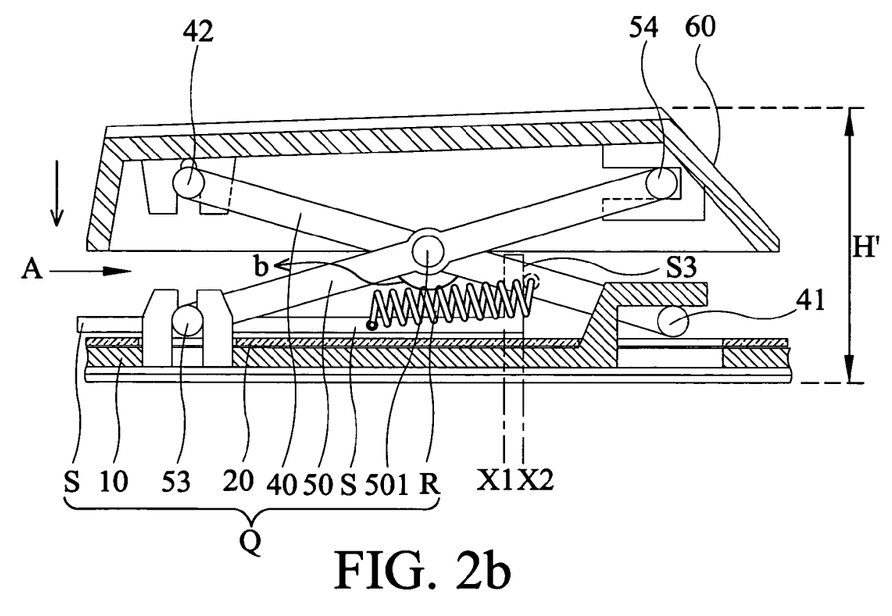
FIG. 2b is a perspective diagram of an exemplary embodiment of an elevated key structure in a depressed state.

Referring to FIGS. 2a and 2b, an exemplary embodiment of an elevated key structure primarily comprises a resilient mechanism Q and a key cap 60. The resilient mechanism Q provides an elastic force impelling the key cap 60 vertically. In some embodiments, a plurality of the elevated key structures can also be employed in a keyboard of a laptop computer.

In FIG. 2a, a first rod 40 and a slider S are connected via the resilient member R, such as a spring. When the key structure is in an original state as shown in FIG. 2a, the slider S is situated in a first position X1. In this state, the key structure can be normally operated, wherein the first and second rods 40 and 50 form a first angle a, and the key cap 60 is situated at a first height H with respect to the substrate 10. The resilient member R, as shown in FIG. 2a, is extended and exerts a pre-tension force f on the first rod 40, wherein an abutting portion S3 of the slider S abuts the first rod 40 by elastic force, thus maintaining the key structure in the original state. When the key cap 60 is pressed downward by external force, as shown in FIG. 2c, the resilient member R is further extended and provides a recovery force F to return the key structure to the original state as shown in FIG. 2a.

Figure 2C:
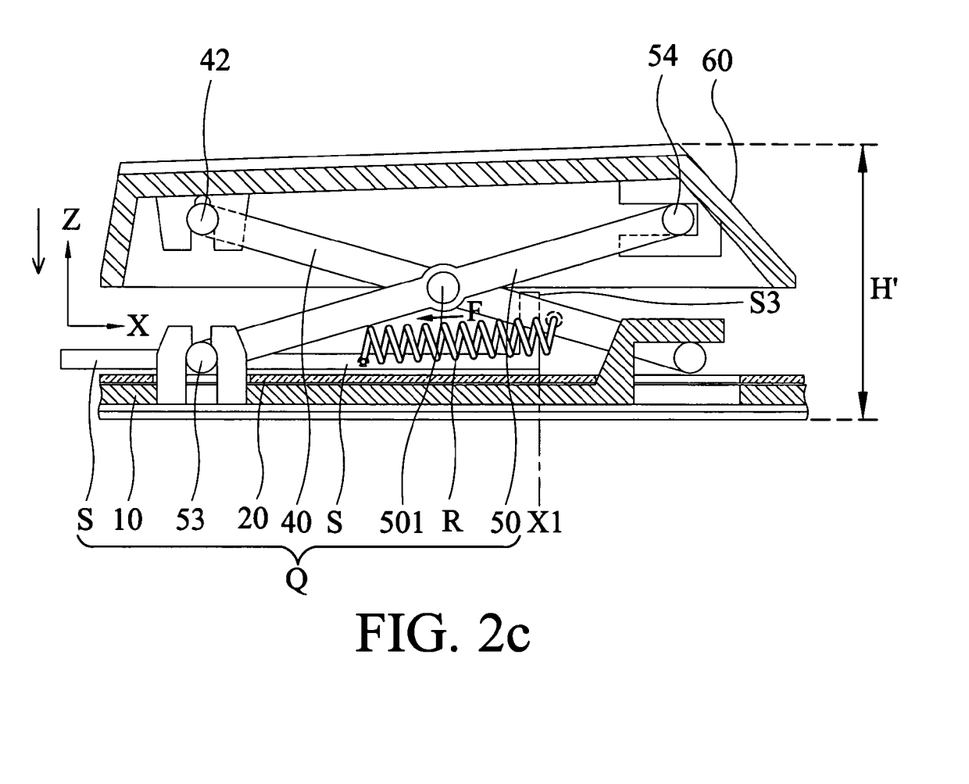
Figure 2D:
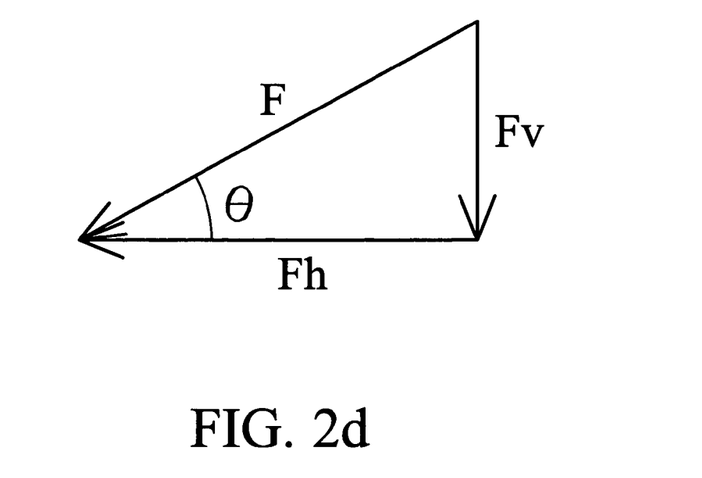
FIG. 2d is a perspective diagram of an included angle θ formed between a recovery force F and a substrate.

When the key structure is pressed downward from the state shown in FIG. 2a to the state shown in FIG. 2c, the slider S remains in the first position X1. The resilient member R is further extended and exerts a recovery force F on the first rod 40, wherein the recovery force F is greater than the pre-tension force f. Specifically, the recovery force F and the substrate 10 form an slight included angle θ less than 45°, as shown in FIG. 2d. The resilient member R exerts a horizontal elastic force Fh and a vertical elastic force Fv to elevate the key cap 60.

To depress the key structure after using, the key cap 60 descends from the first height H to the second height H' due to shifting of the slider S from the first position X1 shown in FIG. 2a to the second position X2 shown in FIG. 2b. In FIG. 2b, the first and second rods 40 and 50 form a second angle b, wherein b>a. From the state shown in FIG. 2a to the state shown in FIG. 2b, the slider S impels the first end 41 in the first direction A via the abutting portion S3, and the resilient member R maintains slight extension, continuously providing pre-tension force f to the first rod 40.

The key cap 60 can also be elevated from the depressed state in FIG. 2b to the original state in FIG. 2a by reverse motion of the slider S from the second position X2 to the first position X1. As the resilient member R is moved with the slider S horizontally between the original state and the depressed state without further deformation of the resilient member R, it is more robust and easier to use than the conventional key structure shown in FIGS. 1a and 1b.

Figure 2E:
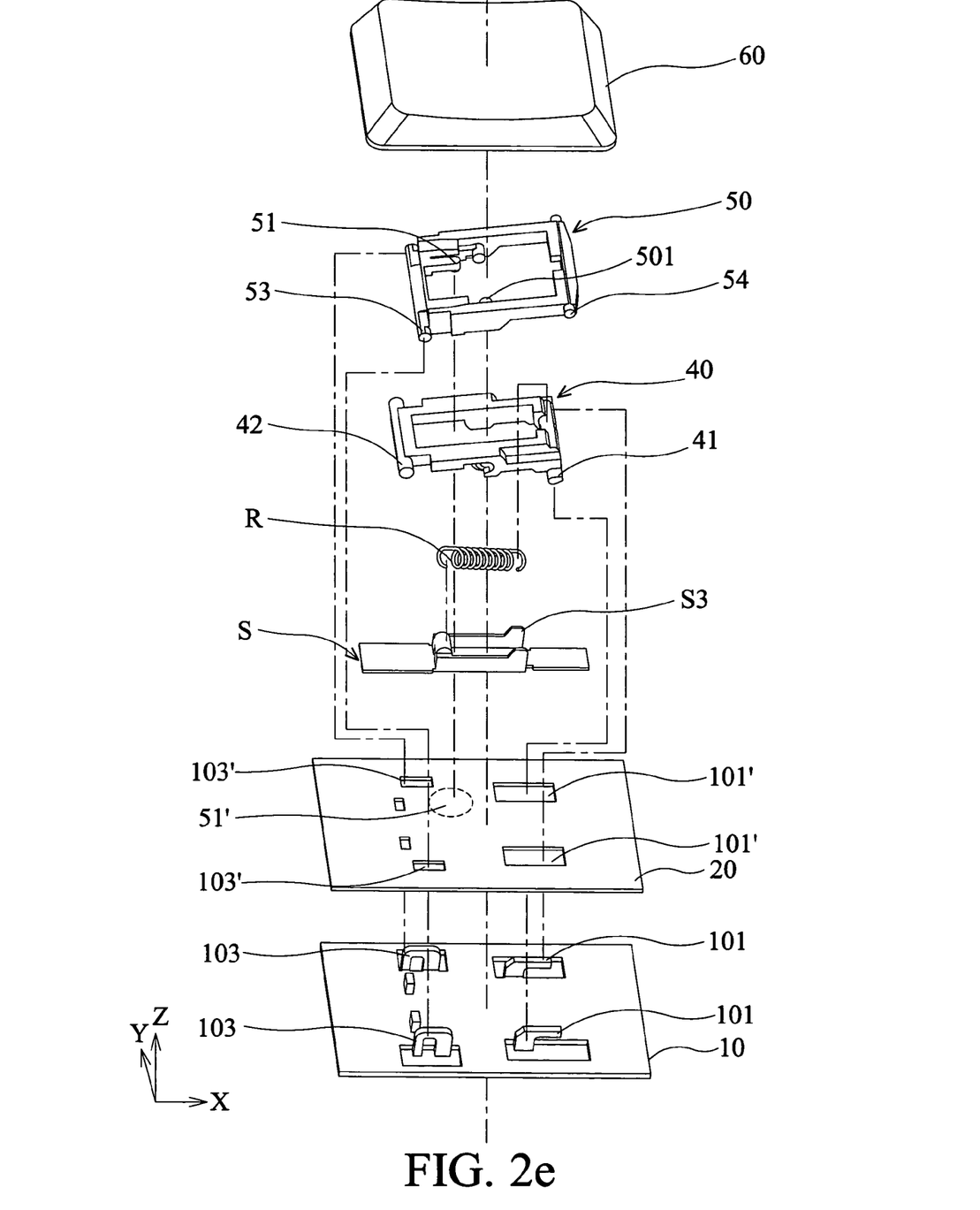
FIG. 2e is an exploded diagram of an exemplary embodiment of an elevated key structure.

As shown in FIG. 2e, an exemplary embodiment of an elevated key structure primarily comprises a substrate 10, a circuit membrane assembly 20, a first rod 40, a second rod 50, a key cap 60, a resilient member R and a slider S. The substrate 10 comprises a plurality of first and second connecting portions 101 and 103, passing through first openings 101' and second openings 103' of the circuit membrane assembly 20 respectively.

The first and second rods 40 and 50 are pivotally connected via a hinge 501. The first rod 40 has a first end 41 movably and pivotally joined in the first connecting portion 101, and a second end 42 pivotally connected to the key cap 60. The second rod 50 has a third end 53 pivotally connected to the second connecting portion 103, and a second end 54 movably and pivotally connected to the key cap 60. Specifically, the slider S and the first rod 40 are connected via the resilient member R, such as a spring. As shown in FIG. 2e, the slider S has an abutting portion S3 abutting the first rod 40.

Figure 2F:
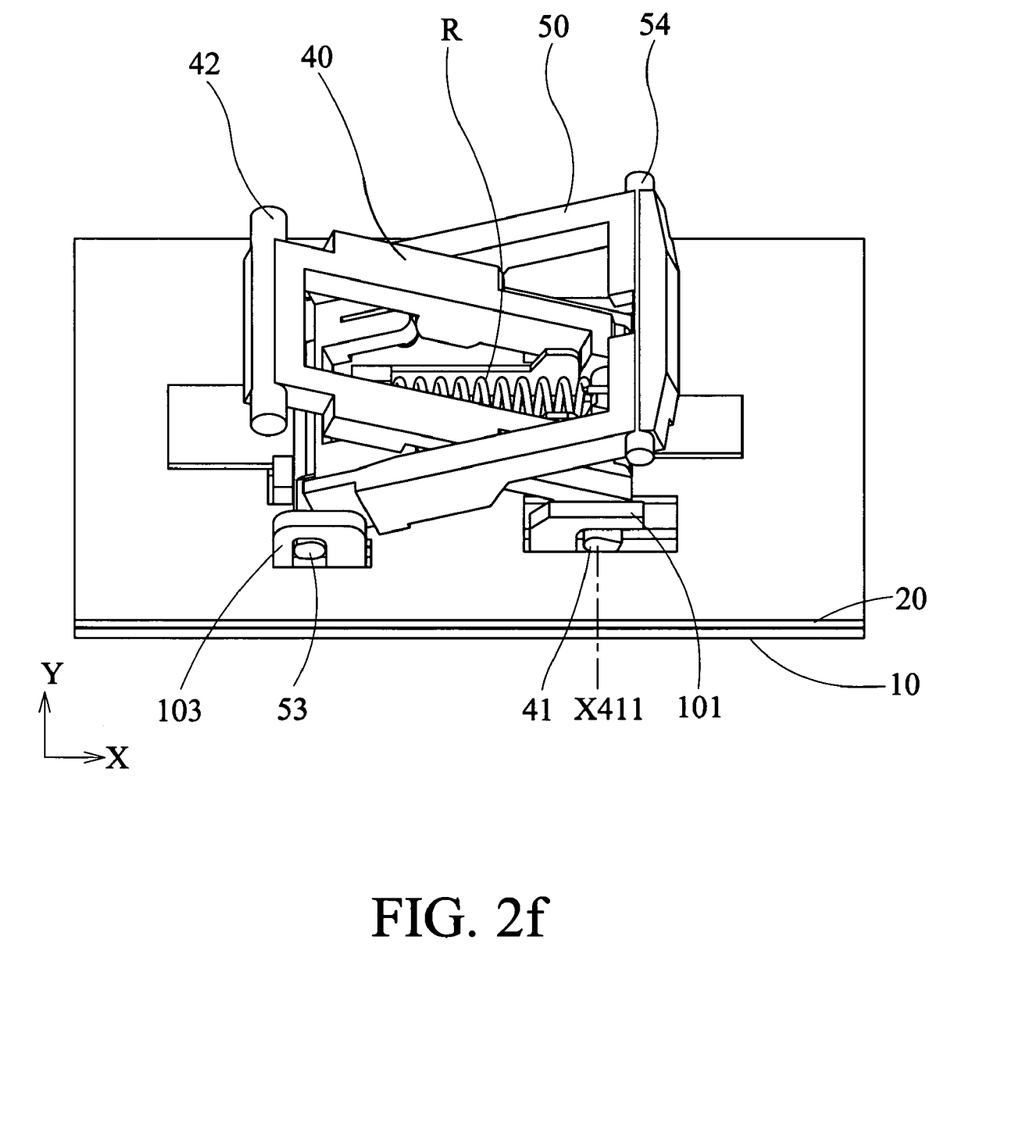
FIG. 2f is a perspective diagram of an exemplary embodiment of an elevated key structure in a original state.
Figure 3A:
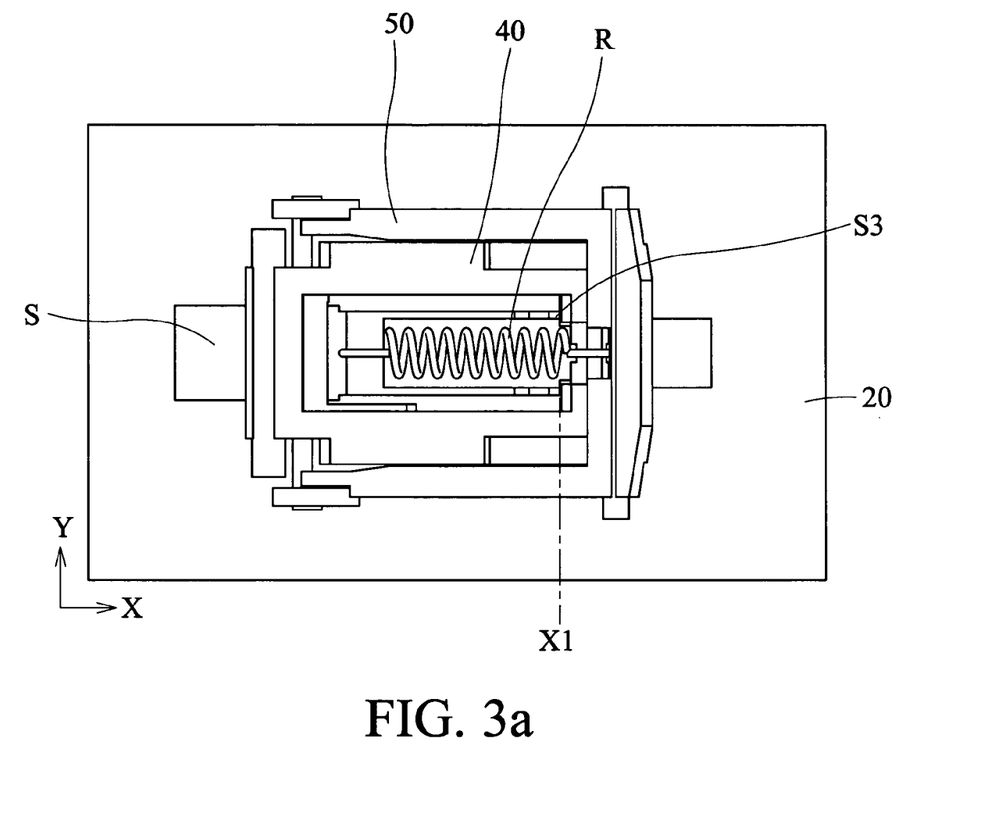
FIG. 3a is a top view of the elevated key structure in an original state according to FIG. 2f.
Figure 3B:
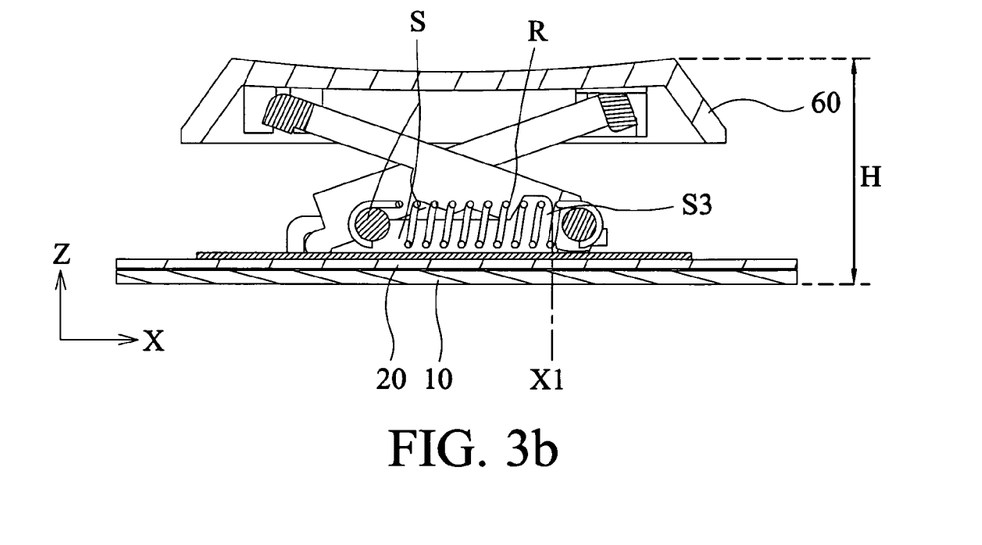

Referring to FIG. 2f, 3a and 3b, when the slider S is in a first position X1, the resilient member R is extended and exerts a pre-tension force on the first rod 40, wherein the abutting portion S3 abuts the first rod 40 by elastic force. In FIG. 2f, the first end 41 is restricted to a position X411 by the first connecting portion 101. In this state, the key structure is in an original state with a scissors-type support mechanism formed by the first and second rods 40 and 50, and the key cap 60 is situated at a first height H as shown in FIG. 3b.

Figure 4A:
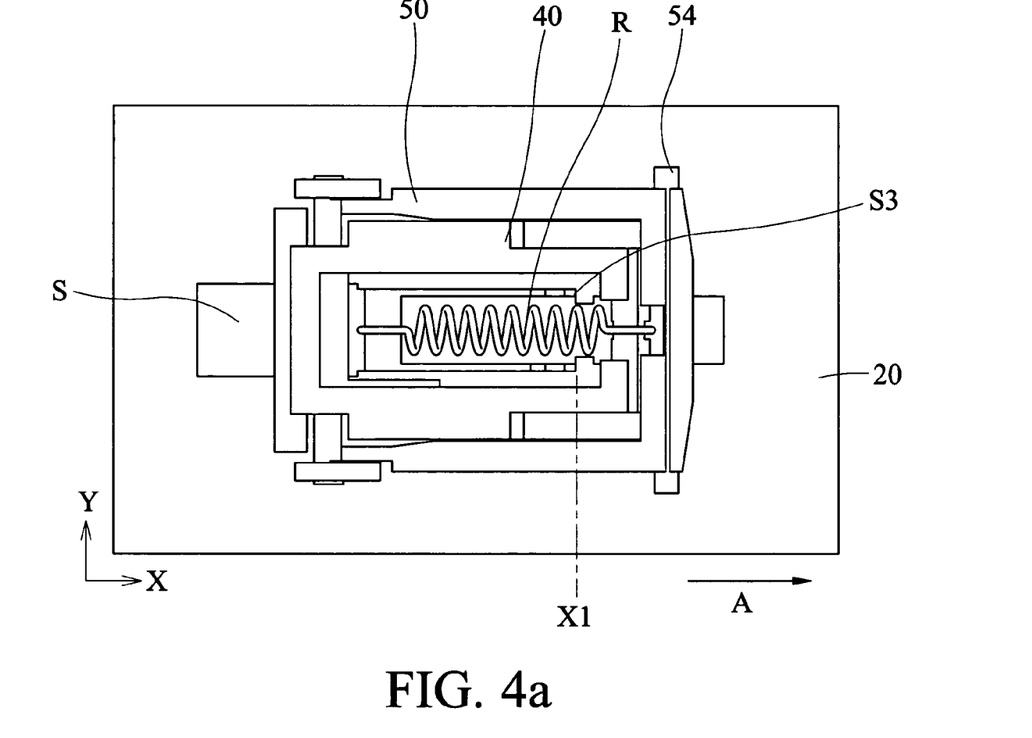
Figure 4B:
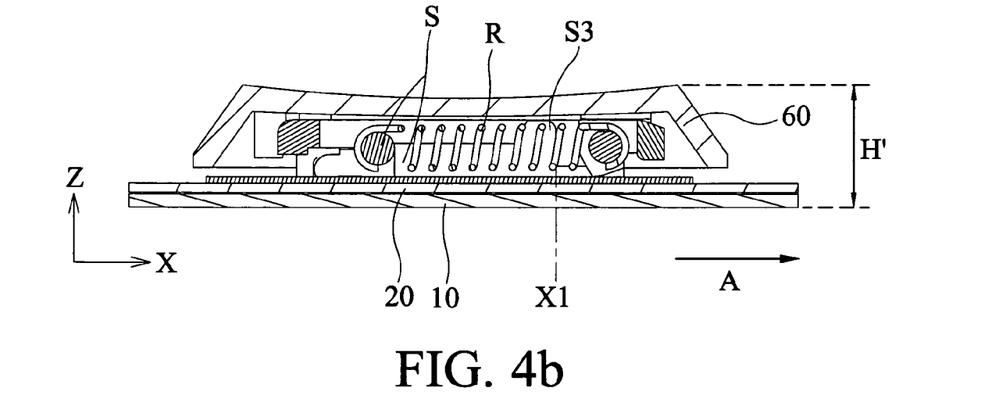

When the key cap 60 is pressed downward by external force as shown in FIGS. 4a and 4b, the slider S remains in the first position X1, and the first end 41 moves in the first direction A (along X axis). The key cap 60 descends from the first height H to the second height H', so as to contact and active a switch circuit in the circuit membrane assembly 20. Since the slider S is stationary in the first position X1, the resilient member R experiences further extension when the key cap 60 is pressed downward by external force. When the external force is released, recovery force from the resilient member R returns the key cap 60 to the first height H.

Figure 5A:
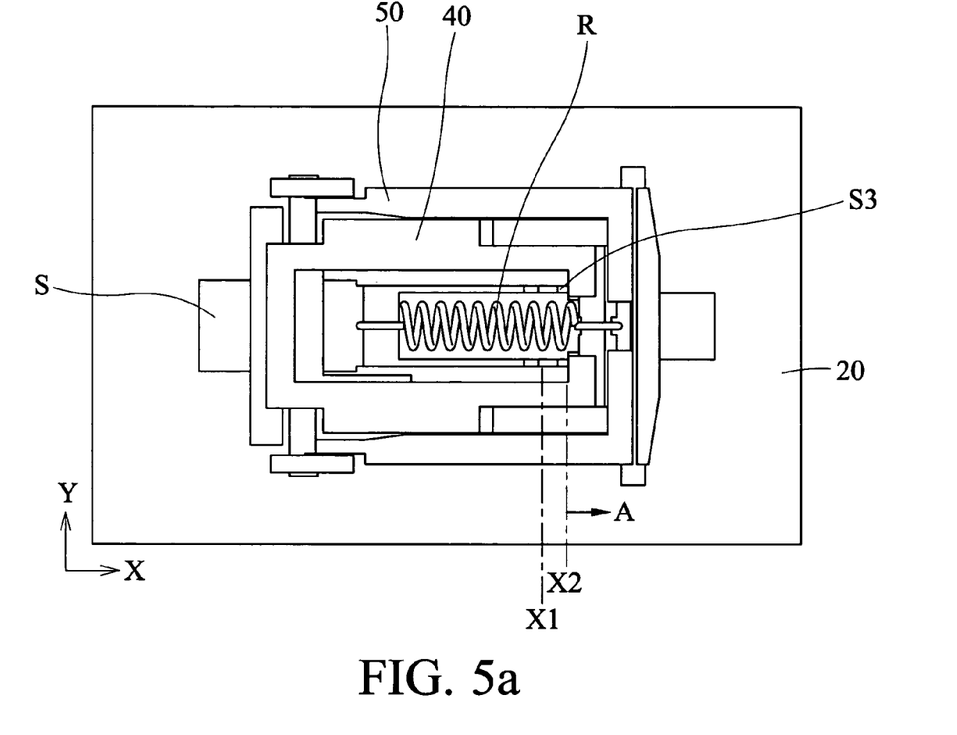
FIG. 5a is a top view of an exemplary embodiment of an elevated key structure in a depressed state.
Figure 5B:
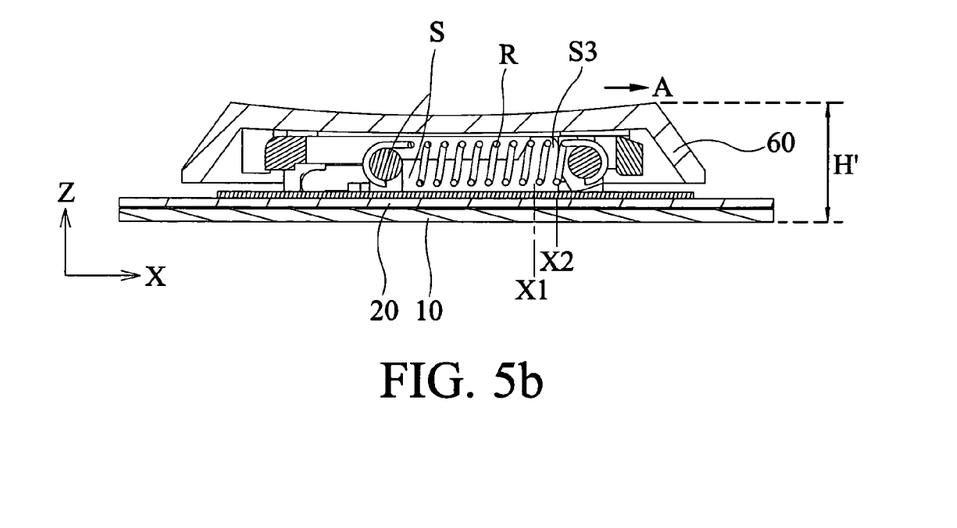

As shown in FIGS. 5a and 5b, the key structure can be minimized by shifting the slider S from the first position X1 to the second position X2 in the first direction A. As slider S impels the first rod 40 from the first position X1 to the second position X2, the key cap 60 is depressed to the second height H' as shown in FIG. 5b. Specifically, when the slider S moves from the first position X1 to the second position X2, the abutting portion S3 continuously abuts the first rod 40, and the resilient member R is extended and provides constant pre-tension force f to the first rod 40.

The key cap 60 can also be elevated by shifting the slider S from the second position X2 to the first position X1 reversely. As the first rod 40 can be drawn by the slider S and the resilient member R opposite to first direction A, the first end 41 returns to the position X411 as shown in FIG. 2f.

Thus, the key structure is elevated from the depressed state shown in FIG. 5b to the original state shown in FIG. 3b. Referring to FIG. 2e, the first rod 40 further has a contact portion 51 to contact and active a switch circuit 51' in the circuit membrane assembly 20. When the key cap 60 is pressed downward from the original state, as shown in FIG. 4b, the contact portion 51 contact and active the switch circuit 51'.

Figure 6A:
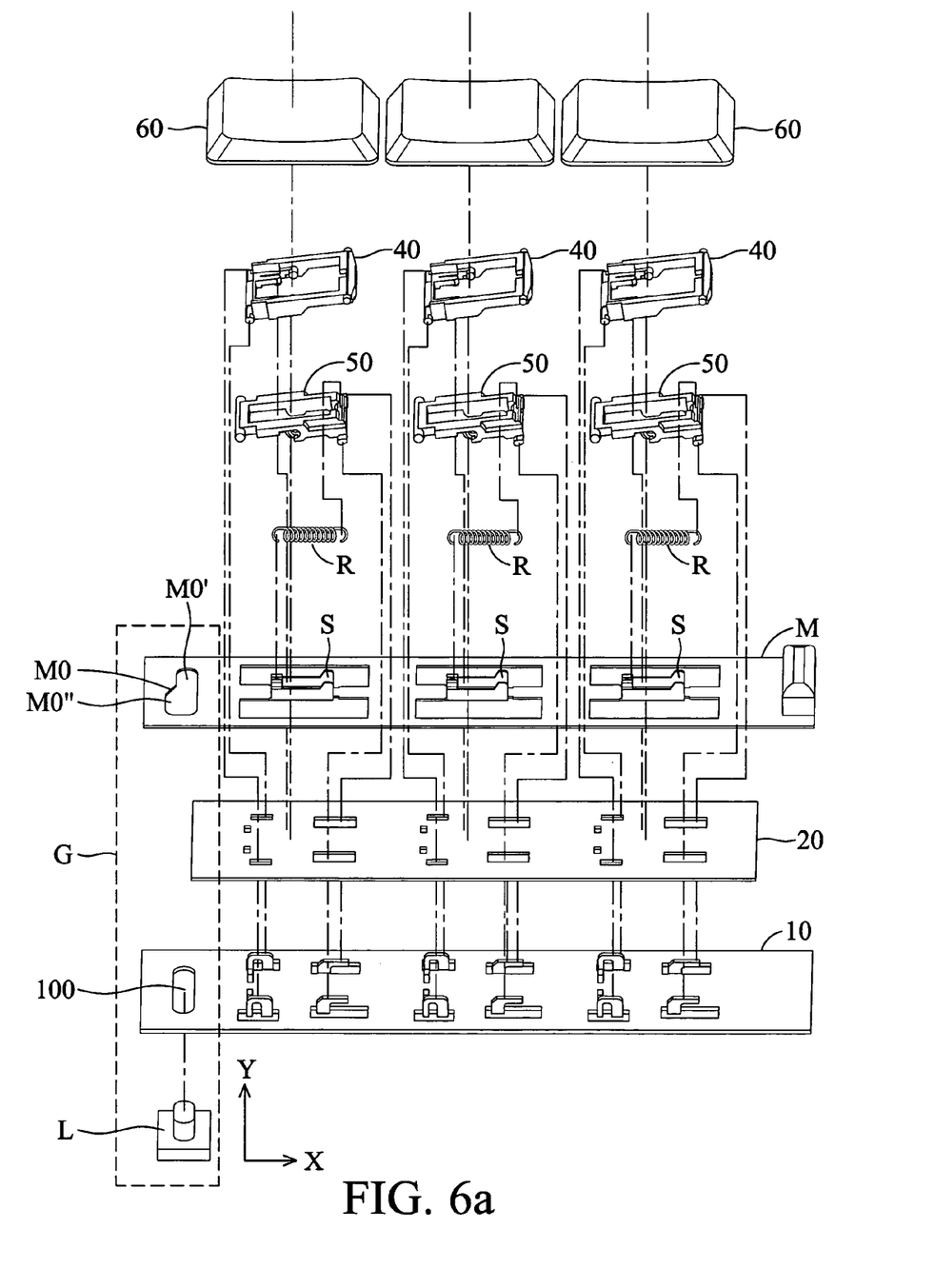
FIG. 6a is an exploded diagram of an exemplary embodiment of an keyboard with elevated keys.

FIG. 6a is an exemplary embodiment of a keyboard employing a plurality of elevated key structures. The keyboard comprises a switch member L and a sliding plate M for switching the elevated key structures. As shown in FIG. 6a, a plurality of sliders S is disposed on the sliding plate M. The switch member L passes through a first slot 100 of the substrate 10 and a tapered second slot MO of the sliding plate M. The switch member L, the first and second slots 100 and MO form a switch mechanism capable of switching the key structure, wherein the switch member L is movable in the first slot 100. Furthermore, the switch member L is also movable between a narrow end MO' and a wide end MO" within the second slot MO.

Figure 6B:
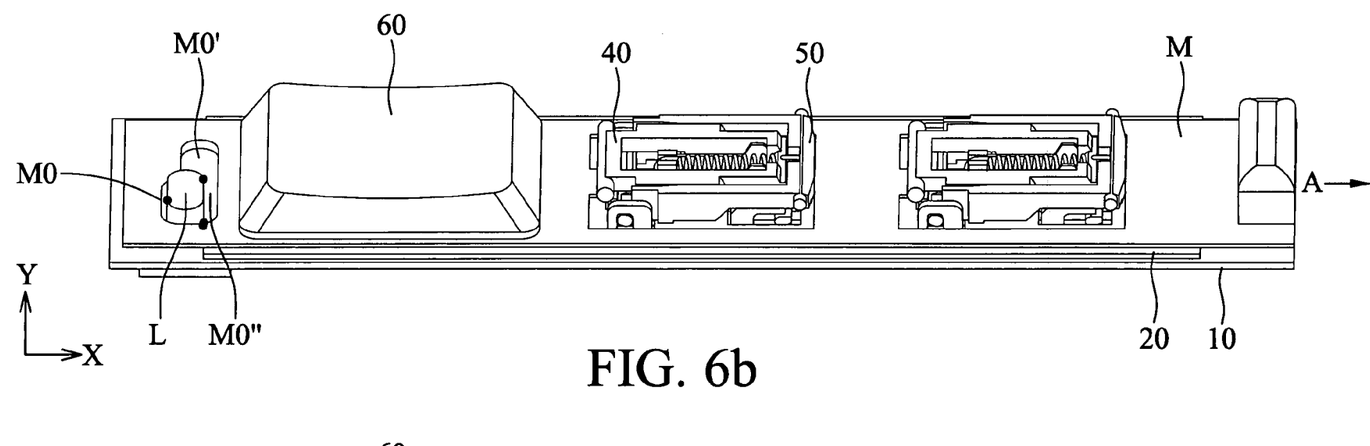
FIG. 6b is a perspective diagram of an exemplary embodiment of a keyboard in a depressed state.
Figure 6C:
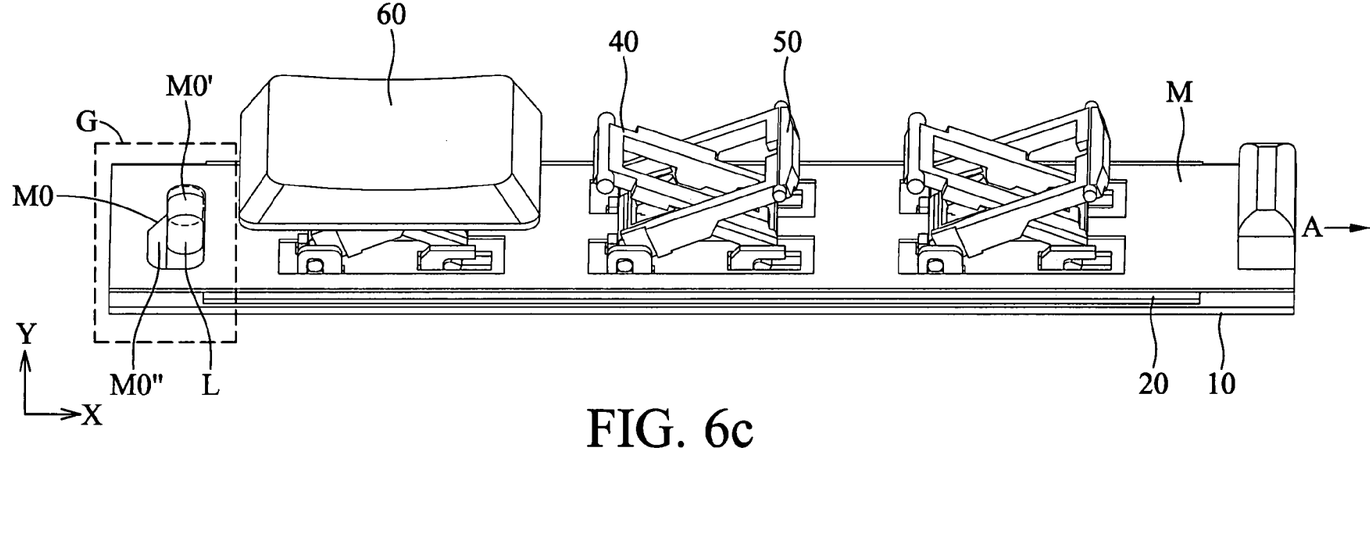
FIG. 6c is a perspective diagram of an exemplary embodiment of a keyboard in an original state.

The key caps 60 of the keyboard can be vertically moved between an original state shown in FIG. 6c and a depressed state shown in FIG. 6b by shifting the switch member L between the narrow end MO' and the wide end MO" within the second slot MO, while the sliders S are moved along X axis by the sliding plate M. As shown in FIGS., 6a and 6b, the key caps 60 descend when the switch member L is moved from the narrow end MO' to the wide end MO", wherein the sliding plate M is movable in the first direction A. However, the key caps 60 can also be elevated from the depressed state shown in FIG. 6b to the original state shown in FIG. 6c reversely by moving the switch member L from the wide end MO" to the narrow end MO', wherein the sliding plate M is moved opposite to the first direction A.

Specifically, as the sliding plate M is restrained from moving along the X axis when the switch member L is situated at the narrow end MO', the key structures can be normally operated in the state shown in FIG. 6c. The second slot MO, however, can also be disposed on the sliders S thus preventing movement along X axis. When the switch member L is situated at the wide end MO", the sliding plate M is released and capable of moving along the X axis. Therefore, the keyboard can be alternatively switched between the original state and the depressed state.

Figure 7:
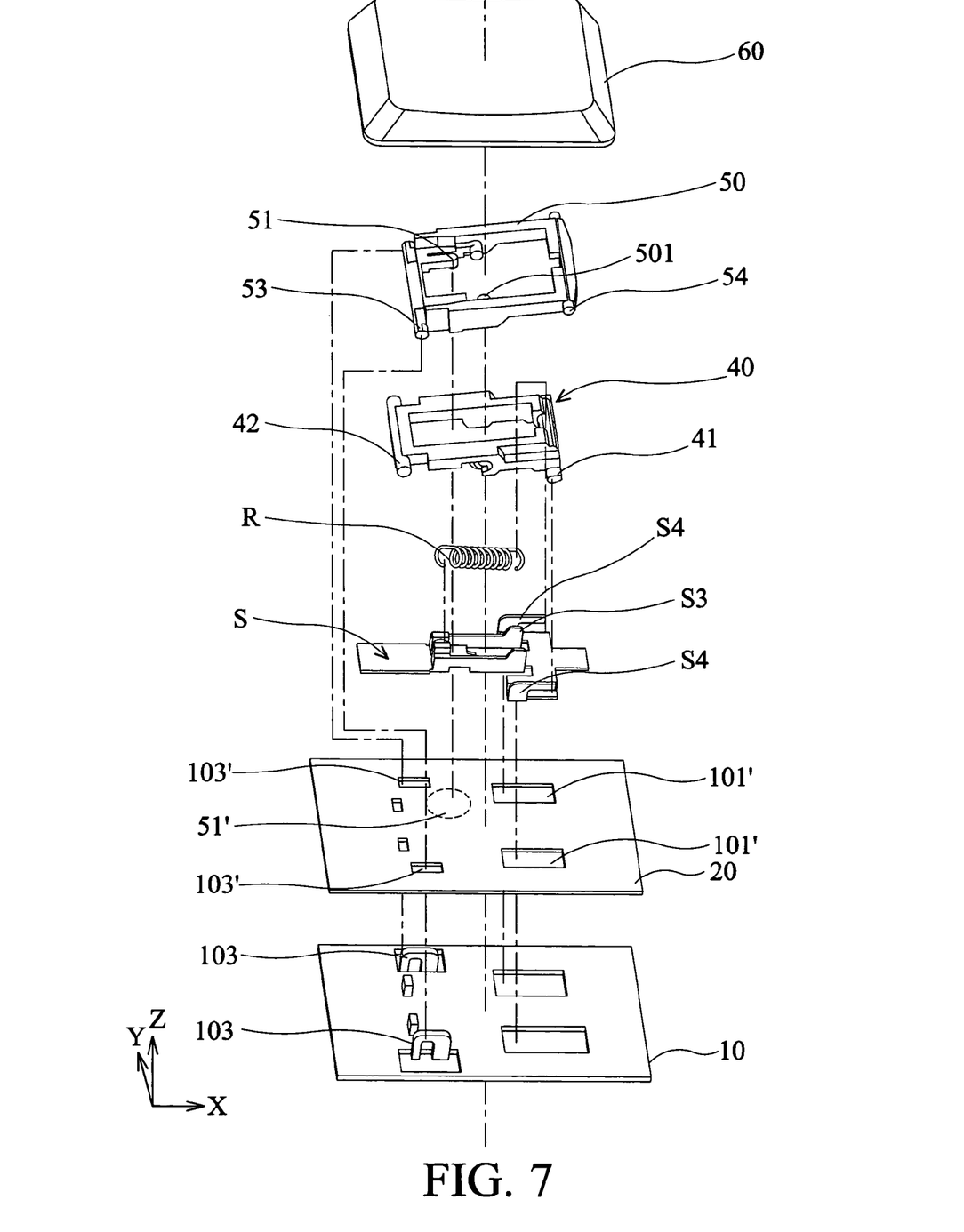
FIG. 7 is a exploded diagram of an exemplary embodiment of an elevated structure.

FIG. 7 is another exemplary embodiment of an elevated key structure. The difference from the former embodiment is that slider S has two guide portions S4 functioning as the connecting portions 101 in FIG. 2e, wherein the fourth end 41 of the first rod 40 is situated in the guide portion S4 and movable along X axis. The key cap 60 can be alternatively elevated or depressed between the original state and the depressed state. The guide portions S4, however, can also be disposed on the sliding plate M or the sliders S of a keyboard as shown in FIG. 6a.

Figure 8A:
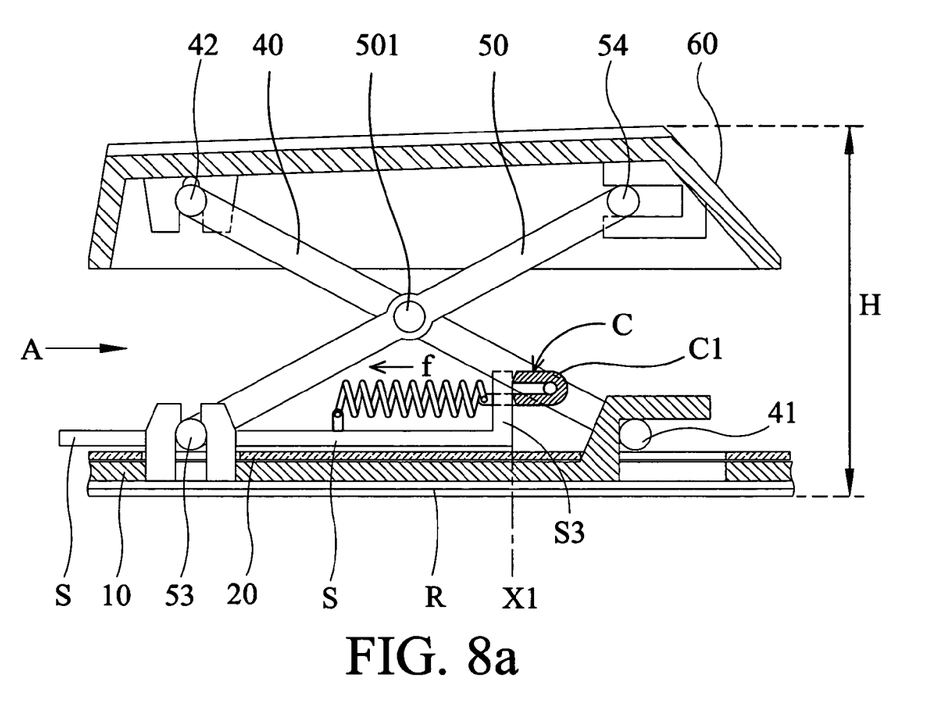
FIG. 8a is a perspective diagram of an exemplary embodiment of an elevated key structure in an original state.
Figure 9A:
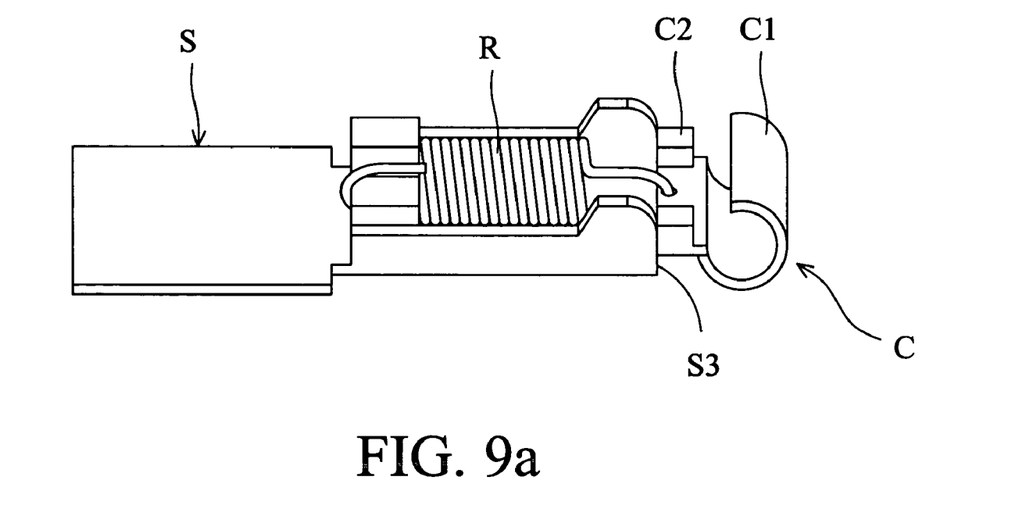
FIG. 9a is a perspective diagram of an exemplary embodiment of a connecting member and a slider connected by a resilient member.

Referring to FIGS. 8a and 9a, an exemplary embodiment of an elevated key structure comprises a connecting member C connecting a resilient member R and a first rod 40. In FIG. 9a, the connecting member C has a pivot portion C1, such as a hook, pivotally connected to the first rod 40 and a contact portion C2 abutting the abutting portion S3 of the slider S. When the key structure is in an original state as shown in FIG. 8a, the slider S is situated in a first position X1, wherein the abutting portion S3 abuts the contact portion C2 as shown in FIG. 9a. *Specifically, the resilient member R is slightly extended and exerts pre-tension force f on the first rod 40.*

Figure 8B:
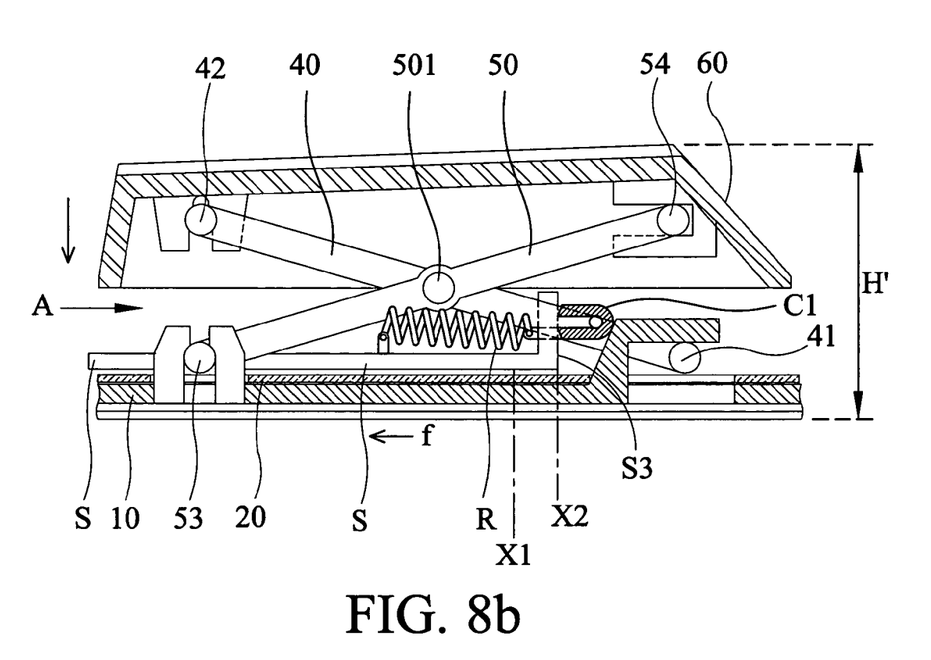
FIG. 8b is a perspective diagram of an exemplary embodiment of an elevated key structure in a depressed state.

The key structure can be depressed by moving the slider S from the first position X1 to a second position X2 along a first direction A, as shown in FIG. 8b. With the slider S abuts and impels a first end 41 of the first rod 40 in the first direction A, the key cap 60 descends from a first height H to a second height H', wherein H'<H. From the state shown in FIG. 8a to the state shown in FIG. 8b, constant pre-tension force f is continuously provided by the resilient member R.

Figure 8C:
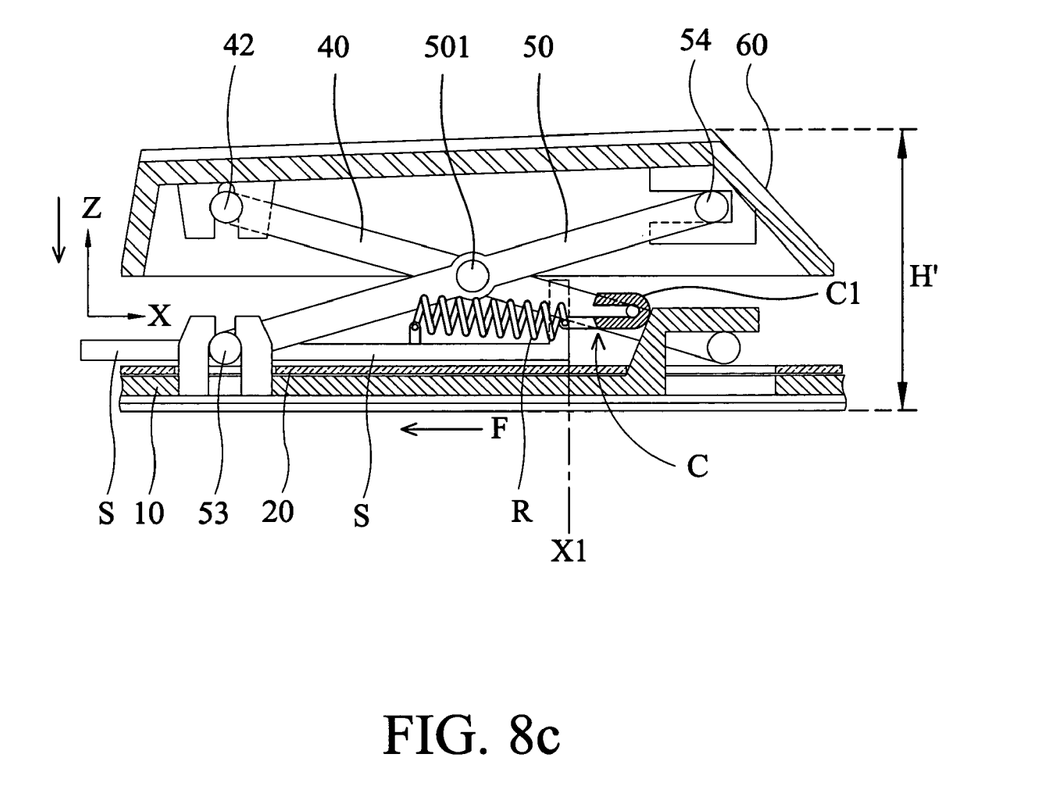
Figure 9B:
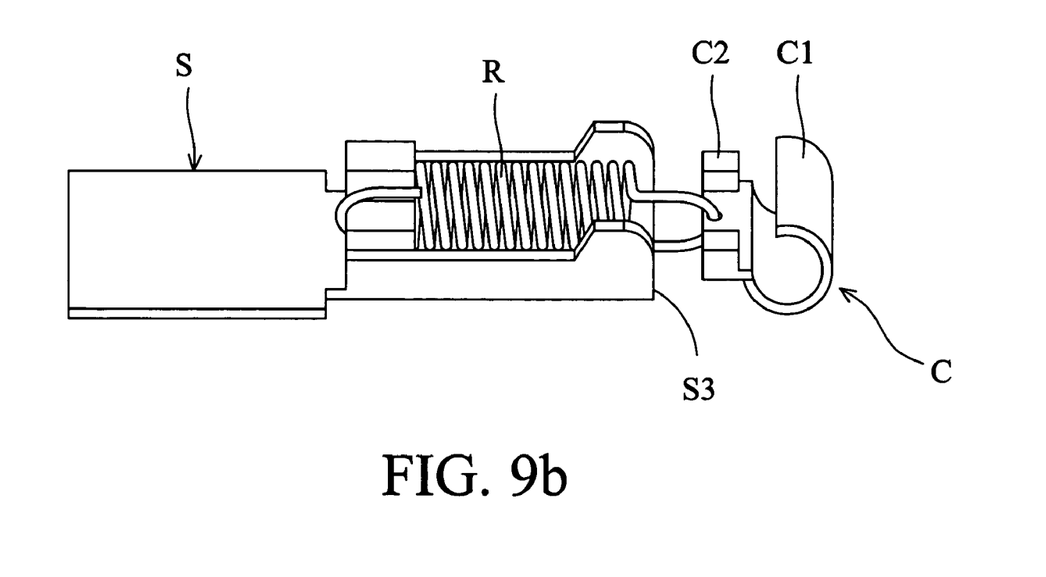

The key structure is situated in the original state, the key cap 60 can be pressed downward from the state shown in FIG. 8a to the state shown in FIG. 8c by external force. In FIG. 8c, the slider S is stationary in the first position X1, and the connecting member C is drawn by the first rod 40 in the first direction A, thus separating from the slider S as shown in FIG. 9b. The resilient member R is further extended and provides a recovery force F to elevate the key cap 60, wherein F>f.

As shown in FIGS. 8c and 9b, as the slider S and the connecting member C are connected by the resilient member R, wherein the connecting member C is separable with respect to the slider S, assembly can be simplified. Furthermore, as the connecting member C is pivotally connected to the first rod 40, thus reducing adverse friction and facilitating easier operation of the key structure.

An elevated key structure and a keyboard with a plurality of elevated key structures are provided according to the exemplary embodiments. The keyboard with elevated key structures can be applied in a laptop computer, providing easier operation and miniaturization.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A key structure, comprising:
   a main body;
   a key cap;
   a substrate;
   a first rod, comprising a first end movable in a first direction and a second end connected to the key cap;
   a second rod connected to the first rod, comprising a third end and a fourth end, wherein the third end connects the substrate and the fourth end movably connects the key cap; and
   a slider movable in the first direction with respect to the substrate between a first position and a second position, wherein when the slider is in the first position, the key structure is in an original state and the key cap is situated at a first height with respect to the substrate; and
   a resilient member, connecting the slider and the first rod, wherein the resilient member is extended and provides a pre-tension force to the first rod when the key structure is situated in the original state, and when the slider moves from the first position to the second position, the first rod is impelled by the slider, and the key cap descends toward the substrate to a second height lower than the first height such that the key structure is situated in a depressed state.

2. The key structure as claimed in claim 1, wherein the slider comprises an abutting portion abutting the first rod and impelling the first end in the first direction.

3. The key structure as claimed in claim 2, wherein the abutting portion continuously abuts the first rod, and the resilient member continuously provides the pre-tension force from the original state to the depressed state.

4. The key structure as claimed in claim 2, wherein the abutting portion continuously abuts the first rod when the slider moves from the first position to the second position.

5. The key structure as claimed in claim 1, wherein when the key cap is pressed toward the substrate from the original state, the resilient member is extended and exerts a recovery force exceeding the pre-tension force.

6. The key structure as claimed in claim 5, wherein the recovery force and the substrate form an included angle less than 45°.

7. The key structure as claimed in claim 1, wherein the resilient member comprises a spring.

8. The key structure as claimed in claim 1, wherein the resilient member moves with the slider between the first and second positions.

9. The key structure as claimed in claim 1 further comprising a switch mechanism, wherein the slider is restricted in the first position by the switch mechanism when the key structure is in the original state.

10. The key structure as claimed in claim 1, wherein the first end is movably connected to the substrate.

11. The key structure as claimed in claim 10, wherein the substrate comprises a first connecting portion movably connected to the first end and a second connecting portion pivotally connected to the third end.

12. The key structure as claimed in claim 11, further comprising a circuit membrane assembly disposed between the slider and the substrate, the circuit membrane assembly comprising a first opening and a second opening, wherein the first connecting portion passes through the first opening, and the second connecting portion passes through the second opening.

13. The key structure as claimed in claim 12 wherein the first rod comprises a first contact portion contacting the circuit membrane assembly when the key cap is pressed toward the substrate.

14. The key structure as claimed in claim 1, wherein the first rod movably connects the slider.

15. A keyboard, comprising:
a substrate;
a plurality of key structures, each of the key structures comprising:
a key cap;
a slider movable in a first direction with respect to the substrate between a first position and a second position;
a first rod, comprising a first end movable in the first direction and a second end connected to the key cap; and
a second rod connected to the first rod, comprising a third end and a fourth end, wherein the third end connects the substrate and the fourth end movably connects the key cap; and
a resilient member, connecting the slider and the first rod, wherein the key structure is in an original state and the key cap is situated at a first height with respect to the substrate when the slider is in a first position, and when the slider moves from the first position to the second position, the first rod is impelled by the slider and the key cap descends toward the substrate to a second height lower than the first height, such that the key structure is in a depressed state, wherein when the key cap is pressed toward the substrate from the original state, the resilient member is extended and exerts a recovery force for returning the key structure to the original state.

16. The key structure as claimed in claim 15, wherein the slider comprises an abutting portion abutting the first rod and impelling the first end in the first direction.

17. The key structure as claimed in claim 15, wherein the recovery force and the substrate form an included angle less than 45°.

18. The key structure as claimed in claim 15, wherein the resilient member moves with the slider between the first and second positions.

19. The key structure as claimed in claim 15 further comprising a sliding plate with the slider disposed thereon.

20. The key structure as claimed in claim 15 further comprising a switch mechanism, wherein the slider is restricted in the first position by the switch mechanism when the key structure is in the original state.

21. The key structure as claimed in claim 15, wherein the first rod movably connects the slider.

22. The key structure as claimed in claim 15, wherein the resilient member is a spring.

23. The key structure as claimed in claim 15 further comprising a connecting member abutting the slider, wherein the first rod and the resilient member are connected by the connecting member.

24. The key structure as claimed in claim 23 further comprising a pivot portion pivotally connecting the first rod.

25. The key structure as claimed in claim 23, wherein the connecting member further comprises a contact portion abutting the slider.

26. The key structure as claimed in claim 23, wherein the resilient member is extended and provides a pre-tension force when the key structure is in the original state.

27. The key structure as claimed in claim 23, wherein the resilient member is extended and provides a pre-tension force when the key structure is in the depressed state.

28. The key structure as claimed in claim 23, wherein the resilient member is extended and continuously provides a pre-tension force from the original state to the depressed state.

29. A resilient mechanism, exerting a recovery force on a key cap, comprising:
a substrate;
a first rod, comprising a first end movably connected to the substrate and a second end connected to the key cap;
a second rod connected to the substrate and the key cap, wherein the first and second rods are pivotally connected to form a scissors-type support mechanism;
a slider movable in a first direction with respect to the substrate between a first position and a second position; and
a resilient member connecting the slider and the first rod, wherein the first and second rods form a first angle and the slider is in the first position when the resilient mechanism is situated in an original state, and when the slider moves from the first position to the second position, the first rod is impelled by the slider in the first direction, and the first and second rods form a second angle exceeding the first angle, such that the key structure is in a depressed state, wherein when the key cap is pressed toward the substrate from the original state, the resilient member is extended and exerts the recovery force on the key cap.

30. The resilient mechanism as claimed in claim 29, wherein the slider comprises an abutting portion abutting the first rod, so as to impel the first end in the first direction.

31. The key structure as claimed in claim 29, wherein the recovery force and the substrate form an included angle less than 45°.

32. The key structure as claimed in claim 29, wherein the first rod further comprises a second end, the second rod further comprises a fourth end, and recovery force is exerted on the key cap via the second and fourth ends to return the key structure to the original state.

* * * * *